DATA PROCESSING SYSTEM INCLUDING MEANS FOR INTERRUPTING A PROGRAM BEING EXECUTED

Original Filed July 7, 1966

INVENTORS
ROBERT COHEN
JOHN F. COULEUR
RICHARD L. RUTH
BY
Arnold E. Renner
Ronald M. O'Keefe
William C. Cahill
ATTORNEYS United States Patent Office 3,523,283

Patented Aug. 4, 1970

3,523,283

DATA PROCESSING SYSTEM INCLUDING MEANS FOR INTERRUPTING A PROGRAM BEING EXECUTED

Robert Cohen, Pohn F. Couleur, and Richard L. Ruth, Phoenix, Ariz., assignors to General Electric Company, a corporation of New York Continuation of application Ser. No. 563,521, July 7, 1966. This application May 7, 1969, Ser. No. 822,748

Int. Cl. H04j 3/12

U.S. Cl. 340—172.5 9 Claims

ABSTRACT OF THE DISCLOSURE

A data processing system including a memory controller connected as a sole communication channel between a memory device and any of a plurality of communication devices. One of the communication devices is a data processing system for executing instructions stored in memory. A program including a plurality of instructions may be executed by the data processor and the execution may be interrupted in response to predetermined conditions and a request for an interruption. A communicating device such as an input-output controller may request an interruption of the program being executed by the data processor by simply providing an interrupt signal to the memory controller. The interrupt signal thus provided is generated without address considerations and in response thereto the memory controller generates a partial address and provides the partial address to the data processing system, which subsequently completes the address.

This application is a continuation of U.S. Pat. application Ser. No. 563,521, filed on July 7, 1966.

The present invention pertains to data processing systems, and more specifically, to data processing systems wherein a program being executed may be interrupted to permit the system to perform a higher priority task.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input-output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily having much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, an input/output controller, a memory controller may be utilized. A memory controller is the sole means of communication among the subsystems of the data processing system and receives requests for access to memory as well as specific requests for communication to other subsystems. The memory controller provides a means for coordingating the execution of operations and transfers of information among the subsystems and may also provide a means for awarding priority when accesses to memory are requested by more than one subsystem.

In systems utilizing plural processors, unique advantages are gained through the use of plural memory controllers. Each of the memory controllers is connected to a different memory device and is also connected to one or more input/output controllers. The transfer of data and instructions throughout the system is facilitated and expedited by the memory controllers through the appropriate awarding of priority and control of access to memory. The multiple memory controllers also individually control communication among the subsystems connected thereto; since the memory controllers may share connection to several subsystems, intercommunication becomes possible. The configuration utilizing multiple data processors and memory controllers effectively yields overlapping data processing systems wherein each system is semi-autonomous and each may execute independent programs. Each input/output controller is provided with means for selecting a particular memory controller as its main memory controller; similarly, each memory controller includes means for selecting a particular data processor as the control processor. By thus appropriately selecting the various subsystems each system of the overlapping systems is chosen to permit the recognition of communication among the subsystems as communication from within the same data processing system.

When in the process of executing a program, and a condition arises requiring immediate attention, provision may be made for a subsystem to generate a program interrupt signal. The present invention includes means for generating a program interrupt signal for servicing a subsystem without waiting for the execution of the program in process. The program interrupt technique employed by the present system permits the interruption of a program under the control of an executive program to prevent interruption unless predetermined requirements for the interrupt are present. Further, since it is possible for more than one subsystem to generate a program interrupt signal, it is therefore possible for the program interrupt signals to substantially simultaneously occur thereby giving rise to conflicting requirements of the various subsystems. To alleviate the problems arising through the simultaneous generation of program signals, the present system permits program interrupts to be executed in accordance with a priority arrangement to thereby first service more urgent requests.

The response to a program interrupt may result in the branching from the program in process to a predetermined subroutine or perhaps an iterative procedure; however, the present system provides flexibility by permitting the response of the system to a program signal to be altered by the system prior to receiving the program interrupt. The response to the program interrupt signal may then take the form of a branch from the presently serviced program to an instruction that may be changed in accordance with an executive program for the system.

It is therefore an object of the present invention to provide a data processing system wherein programs being executed may be interrupted to service other programs or subsystems.

It is another object of the present invention to provide a data processing system wherein the subsystems thereof may generate program interrupt signals and wherein these signals will result in an interruption of a program being executed on the condition that predetermined requirements for the interrupt are met.

It is another object of the present invention to provide a data processing system wherein plural program interrupt signals may be generated, each resulting in the servicing of a program or subsystem.

It is still another object of the present invention to provide a data processing system wherein the program interrupt signals generated by the subsystems thereof result in the servicing of a program or subsystem in accordance with a predetermined priority.

It is a further object of the present invention to provide a data processing system wherein the generation of program interruption signals results in the execution of a changeable instruction or routine under the control of an executive program.

These and other objects of the present invention will become apparent to those skilled in the art as the description proceeds.

Certain portions of the apparatus herein disclosed are not of our invention, but are the inventions of:

Robert Cohen, William A. Shelly, and Samuel M. Vidulich, as defined by the claims of their application, Ser. No. 567,221, filed July 22, 1966;

David L. Bahrs and John F. Couleur, as defined by the claims of their application, Ser. No. 567,222, filed July 22, 1966;

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,376, filed Sept. 6, 1966;

John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being asigned to the assignee of the present application.

DESCRIPTION OF FIGURES

The present invention may more readily be described by reference to the accompanying drawings in which:

The sole figure is a block diagram of a data processing system in a single memory controller configuration;

Figure 1:
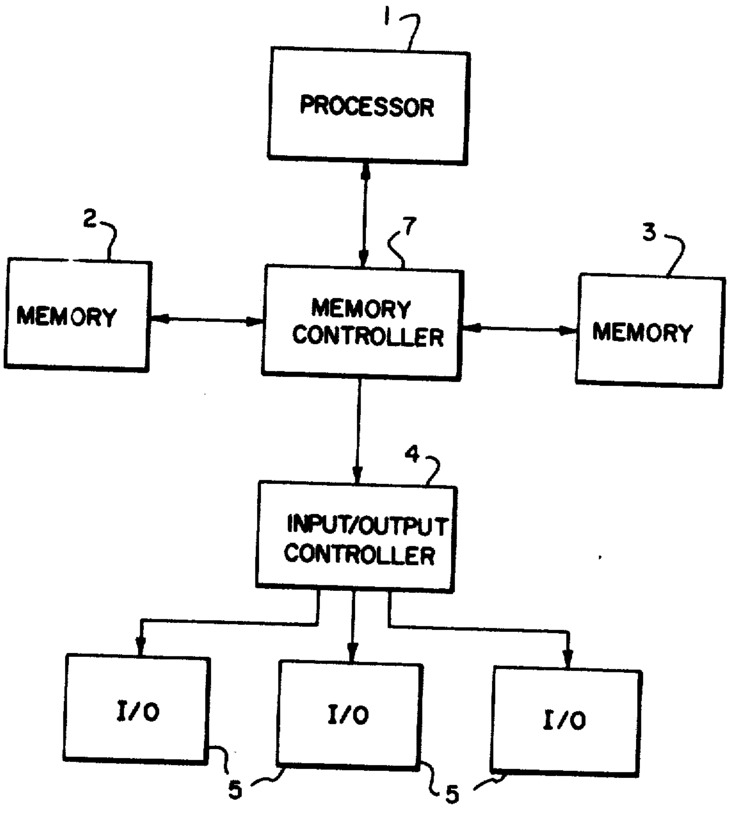

For a complete description of the system of FIG. 1 and of my invention, reference is made to U.S. Pat. No. 3,413,613 issued to David L. Bahrs, John F. Couleur, Richard L. Ruth, and William A. Shelly, on Nov. 26, 1968, and assigned to the assignee of the present invention. More particularly, attention is directed to FIGS. 2–120 and to the specification beginning at column 4, line 32 and ending at column 121, line 42 inclusive of U.S. Pat. No. 3,413,613 which are incorporated herein by reference and made a part hereof.

What is claimed is:

1. In a data processing system, the combination comprising:

a memory device having addressable locations storing data and instructions therein;

a plurality of communicating devices including a data processor manipulating data in accordance with the instructions of a program, at least one of said communicating devices including means for generating an interrupt signal;

a memory controller connected to said memory device and to said communicating devices and controlling communication between said memory devices and said communicating devices and among said communicating devices, said memory controller providing a portion of an address to the data processor connected thereto in response to the receipt by said memory controller of said interrupt signal;

said data processor supplementing said portion of an address to provide a complete address in response to the receipt of said portion of an address;

said memory controller retrieving said data and instructions stored in said memory device at said complete address in response to the receipt of said complete address and providing said retrieved data and instructions to the data processor supplementing said portion of the address.

2. The data processing system according to claim 1 wherein said memory controller generates a notification signal in response to said interrupt signal and transmits said notification signal to said data processor, said notification signal interrupting a program being executed by said data processor.

3. In a data processing system, the combination comprising:

a memory device having addressable storage locations;

interrupt instructions stored in said memory device at said addressable locations;

a plurality of communicating devices including a data processor manipulating data in accordance with the instructions of a program, and including an input/output controller connected to peripheral devices to control the transfer of data to and from said peripheral devices, at least one of said communicating devices including means for generating an interrupt signal;

said data processor requiring access to said memory device to obtain said interrupt instructions therefrom and having means for generating addresses corresponding to said addressable locations storing said interrupt instructions;

a memory controller connected to said memory device and to said communicating devices and controlling communication between said memory device and said communicating devices and among said communicating devices, said memory controller providing a portion of an address to the data processor connected thereto in response to the receipt by said memory controller of said interrupt signal;

said data processor supplementing said portion of an address to provide a complete address in response to the receipt of said portion of an address;

said memory controller retrieving said interruption instructions stored in said memory device at said complete address in response to the receipt of said complete address and providing said interruption instructions to the data processor supplementing said portion of the address;

said supplementing data processor interrupting a program being executed in response to the receipt of said interrupt instruction and executing said interruption instruction instead.

4. A data processing system including means for interrupting a program being executed comprising:

A memory device having addressable storage locations;

interrupt instructions stored in said memory device at said addressable locations;

a plurality of communicating devices including a data processor manipulating data in accordance with the instructions of a program, and including an input/output controller transmitting data to and receiving data from input/output devices;

said data processor requiring access to said memory device for obtaining said interrupt instructions and having means for generating addresses corresponding to said addressable locations storing said interrupt instructions;

said communicating devices including means for generating interrupt signals in response to predetermined conditions;

a memory controller connected to said memory device and to said communicating devices and controlling communication between said memory device and said communicating devices and among said communicating devices, said memory controller providing a portion of an address to the data processor connected thereto in response to the receipt of an interrupt signal;

said portion of an address including a bit configuration unique to the condition giving rise to the generation of said interrupt signal;

said data processor supplementing said portion of an address to provide a complete address in response to the receipt of said portion of an address;

said memory controller retrieving said interruption instructions stored in said memory device at said addressable location in response to the receipt of said complete address and providing said interruption instructions to said data processor;

said data processor interrupting a program being executed in response to the receipt of said interrput instruction and executing said interruption instructions instead.

5. A data processing system including means for interrupting a program being executed comprising:

a memory device having addressable locations storing data and instructions therein;

a plurality of communicating devices including a data processor manipulating data in accordance with the instructions of a program and including an input/output controller transmitting data to and receiving data from input/output devices;

said communicating devices including means for generating interrupt signals in response to predetermined conditions;

a memory controller connected to said memory device and to said communicating devices and controlling communication between said memory device and said communicating devices and among said communicating devices, said memory controller providing a portion of an address to the data processor connected thereto in response to the receipt of an interrupt signal from said communicating devices;

said portion of an address including a bit configuration unique to the condition giving rise to the generation of the interrupt signal;

said data processor supplementing said portion of an address to provide a complete address in response to the receipt of said portion of an address;

said memory controller retrieving said data and instructions stored in said memory device at said complete address in response to the receipt of said complete address and providing said retrieved data and instructions to the data processor supplementing said portion of the address.

6. The data processing system according to claim 5 wherein said memory controller generates a notification signal in response to said interrupt signal and transmits said notification signal to said data processor for interrupting a program being executed by said data processor.

7. A data processing system including means for interrupting a program being executed comprising:

a memory device having addressable locations storing data and instructions therein;

a plurality of communicating devices including a data processor manipulating data in accordance with the instruction of a program, and including an input-output controller transmitting data to and receiving data from input/output devices, said communicating devices including means for generating interrupt signals in response to predetermined conditions;

said data processor requiring access to said memory for obtaining said instructions therefrom and having means for generating addresses corresponding to said addressable locations storing said instructions;

a memory controller connected to said memory device and to said communicating devices and controlling communication between said memory device and said communicating devices and among said communicating devices, said memory controller providing a portion of an address to the data processor connected thereto in response to the receipt of an interrupt signal;

said portion of an address including a bit configuration unique to the condition giving rise to the generation of said interrupt signal;

said data processor supplementing said portion of an address to provide a complete address in response to the receipt of said portion of an address thereby accessing an addressable location in said memory device.

8. In a data processing system, the combination comprising:

storage member storing program instructions including interrupt instructions;

an address determing the position and retrieval of each of said program instructions in said storage member, and including an interrupt address determining the position and retrieval of each of said interrupt instructions, said interrupt address having a base address portion and a modifier address portion;

a data processor manipulating data by performing operations represented by said program instructions;

means in said data processor for retrieving the program instructions in succession from said storage member via said memory controller by transmitting said address to said storage member via said memory controller;

an input/output controller connected to peripheral devices to control the transfer of data to and from said peripheral devices;

a memory controller connected to said storage member, said processor, and said input/output controller, and responsive to provide communication among said data processor, said input/output controller and said storage member;

means for generating an interrupt signal for denoting the occurrence of one of a plurality of different conditions;

means in said memory controller coupled to receive said interrupt signal and responsive thereto for generating one of a plurality of different base address portions, a particular base address portion generated corresponding to a particular condition denoted by said interrupt signal;

means in said data processor for supplying a modifier address portion to provide said interrupt address;

said means in said data processor for retrieving said program instructions transmitting said interrupt address to said storage memory via said memory controller to retrieve said interrupt instruction; and means in said data processor for interrupting the performance of the operation presently being performed in response to the receipt of said interrupt instruction.

9. In a data processing system, the combination comprising:

a storage member storing program instructions including interrupt instructions;

an address determining the position and retrieval of each of said program instructions in said storage member and having a base address portion and a modifier address portion;

a data processor;

an input/output controller connected to peripheral devices to control the transfer of data to and from said peripheral devices;

a memory controller connected to said storage member, said data processor, and said input/output control means, and responsive to provide communication among said data processor, said input/output control means, and said storage member;

means in said data processor for performing operations represented by said program instructions;

means for generating an interrupt signal for denoting the occurrence of one of a plurality of different conditions;

means in said memory controller for generating a notification signal in response to the receipt of said interrupt signal;

means in said data processor for temporarily suspending the operation being executed in response to the receipt of said notification signal;

means in said data processor for generating an interrogation signal in response to the receipt of said notification signal;

means in said memory controller for transmitting one of a plurality of different base address portions to said data processor in response to the receipt of said interrogation signal, the base address portion transmitted corresponding to the condition denoted by said interrupt signal;

means in said data processor for generating a modifier address portion in response to the receipt of said base address portion to form a complete address;

means in said data processor for transmitting said address to said storage member via said memory controller to retrieve a particular interrupt instruction determined by said address.

References Cited

UNITED STATES PATENTS

| | | | |
|---|---|---|---|
| 3,309,675 | 3/1967 | Burt | 340—172.5 |
| 3,312,951 | 4/1967 | Hertz | 340—172.5 |
| 3,315,235 | 4/1967 | Carnevale et al. | 340—172.5 |
| 3,351,909 | 11/1967 | Hummel | 340—172.5 |

OTHER REFERENCES

Olsen, M. M.: "Interrupt for Computer System" in IBM Technical Disclosure Bulletin, October 1962, pp. 32–33.

IBM 7080 Data Processing System—Reference Manual A22–6560–1 (December 1961) Customer Manuals, Dept. 298, Poughkeepsie, N.Y., pp. 9–19.

PAUL J. HENON, Primary Examiner

H. E. SPRINGBORN, Assistant Examiner